United States Patent
Komaili et al.

(10) Patent No.: US 8,265,220 B2
(45) Date of Patent: *Sep. 11, 2012

(54) RATE ADAPTATION FOR USE IN ADAPTIVE MULTI-RATE VOCODER

(75) Inventors: Jaleh Komaili, Irvine, CA (US); Yongbing Wan, San Jose, CA (US)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/932,726

(22) Filed: Oct. 31, 2007

(65) Prior Publication Data

US 2008/0049661 A1    Feb. 28, 2008

Related U.S. Application Data

(63) Continuation of application No. 11/566,006, filed on Dec. 1, 2006, now Pat. No. 7,558,359, which is a continuation of application No. 10/124,464, filed on Apr. 16, 2002, now Pat. No. 7,164,710, which is a continuation of application No. 09/080,013, filed on May 15, 1998, now Pat. No. 6,529,730.

(51) Int. Cl.
*H04L 23/00* (2006.01)
*H04L 7/00* (2006.01)
*H04B 1/38* (2006.01)

(52) U.S. Cl. .................. 375/377; 375/219; 375/358

(58) Field of Classification Search .................. 375/229, 375/225, 242, 377, 222, 219, 240, 358; 370/225, 370/329, 468, 232–234, 252, 277, 282, 333, 370/347, 442, 477, 914, 915; 455/422, 63, 455/72, 452.2, 83

See application file for complete search history.

(56) References Cited

U.S. PATENT DOCUMENTS 4,910,794 A    3/1990   Mahany (Continued)

FOREIGN PATENT DOCUMENTS

FR    2718906    10/1995

(Continued)

*Primary Examiner* — Lawrence B Williams

(74) *Attorney, Agent, or Firm* — Lee, Hong, Degerman, Kang & Waimey

(57) ABSTRACT

The present invention includes a time-division-multiple-access (TDMA) communication system having a base station and at least one mobile station, each transmitting and receiving an analog radio-frequency signal carrying digitally coded speech. The speech is encoded using a vocoder which samples a voice signal at variable encoding rates. During periods when the radio-frequency channel is experiencing high levels of channel interference, the encoded voice channel having a lower encoding rate is chosen. This low-rate encoded voice is combined with the high degree of channel coding necessary to ensure reliable transmission. When the radio-frequency channel is experiencing low levels of channel interference, less channel coding is necessary and the vocoder having a higher encoding rate is used. The high-rate encoded voice is combined with the lower degree of channel coding necessary to ensure reliable transmission. The appropriate levels of channel coding necessary for reliable transmission are determined by various channel metrics, such as frame erase rate and bit error rate. The determination of the appropriate vocoder rate and level of channel coding for both the uplink and downlink may be determined centrally at the base station, with the vocoder rate and level of channel coding for the uplink being relayed to the mobile station. Alternatively, the appropriate vocoder rate and level of channel coding for the downlink may be determined by the mobile station, and the appropriate vocoder rate and level of channel coding for the uplink may be determined by the base station.

4 Claims, 9 Drawing Sheets

U.S. PATENT DOCUMENTS

| | | | |
|---|---|---|---|
| 5,341,456 A | 8/1994 | DeJaco | |
| 5,396,516 A | 3/1995 | Padovani et al. | |
| 5,541,657 A | 7/1996 | Yamamoto et al. | |
| 5,638,408 A | 6/1997 | Takaki | |
| 5,649,299 A * | 7/1997 | Battin et al. | 455/62 |
| 5,673,266 A * | 9/1997 | Li | 370/465 |
| 5,701,294 A * | 12/1997 | Ward et al. | 370/252 |
| 5,734,967 A | 3/1998 | Kotzin et al. | |
| 5,794,180 A | 8/1998 | McCree | |
| 5,825,761 A * | 10/1998 | Tanaka et al. | 370/333 |
| 5,828,672 A | 10/1998 | Labonte et al. | |
| 5,907,555 A | 5/1999 | Raith | |
| 5,940,439 A * | 8/1999 | Kleider et al. | 375/225 |
| 5,970,443 A * | 10/1999 | Fujii | 704/222 |
| 5,974,106 A * | 10/1999 | Dupont et al. | 375/377 |
| 6,009,553 A * | 12/1999 | Martinez et al. | 714/784 |
| 6,049,537 A * | 4/2000 | Proctor et al. | 370/342 |
| 6,104,726 A * | 8/2000 | Yip et al. | 370/468 |
| 6,108,372 A | 8/2000 | Tidemann, Jr. et al. | |
| 6,108,374 A | 8/2000 | Balachandran et al. | |
| 6,134,220 A * | 10/2000 | Le Strat et al. | 370/252 |
| 6,154,489 A | 11/2000 | Kleider et al. | |
| 6,163,577 A | 12/2000 | Ekudden et al. | |
| 6,215,793 B1 * | 4/2001 | Gultekin et al. | 370/465 |
| 6,215,827 B1 | 4/2001 | Balachandran et al. | |
| 6,252,854 B1 * | 6/2001 | Hortensius et al. | 370/252 |
| 6,301,265 B1 * | 10/2001 | Kleider et al. | 370/465 |
| 6,356,211 B1 | 3/2002 | Shimoyoshi et al. | |
| 6,389,066 B1 * | 5/2002 | Ejzak | 375/224 |
| 6,418,147 B1 * | 7/2002 | Wiedeman | 370/468 |
| 6,418,163 B2 | 7/2002 | Tidemann, Jr. et al. | |
| 6,442,145 B1 * | 8/2002 | De Lange et al. | 370/310 |
| 6,480,556 B1 | 11/2002 | Guey | |
| 6,498,625 B1 | 12/2002 | Yamamoto et al. | |
| 6,529,730 B1 | 3/2003 | Komaili et al. | |
| 6,539,205 B1 * | 3/2003 | Wan et al. | 370/465 |
| 6,542,736 B1 * | 4/2003 | Parkvall et al. | 455/452.2 |
| 6,700,881 B1 * | 3/2004 | Kong et al. | 370/335 |
| 6,724,737 B1 * | 4/2004 | Boyden et al. | 370/316 |
| 6,731,948 B1 * | 5/2004 | Lee et al. | 455/522 |
| 6,748,220 B1 * | 6/2004 | Chow et al. | 455/450 |
| 6,912,228 B2 * | 6/2005 | Dahlman et al. | 370/441 |
| 7,072,416 B1 * | 7/2006 | Sudo et al. | 375/295 |
| 7,164,710 B2 | 1/2007 | Komaili et al. | |
| 2002/0035713 A1 * | 3/2002 | Jarvinen et al. | 714/751 |
| 2003/0002446 A1 | 1/2003 | Komaili et al. | |
| 2003/0063583 A1 * | 4/2003 | Padovani et al. | 370/329 |

FOREIGN PATENT DOCUMENTS

| | | |
|---|---|---|
| GB | 2306867 A | 5/1997 |
| JP | 1990-030238 | 1/1990 |
| JP | 1997-087735 | 3/1990 |
| JP | 1997-023212 | 1/1997 |
| JP | 1997-149009 | 6/1997 |
| WO | WO 96/22639 | 7/1996 |
| WO | WO 98/00984 | 1/1998 |
| WO | WO 98/03030 | 1/1998 |

* cited by examiner

Figure 8 (Quantization Table for the Mobile)

| Frame Eraser (FE) | RxQual <= | Transmitted Bits |
|---|---|---|
| 0 | 5 | 000 |
| 0 | 10 | 001 |
| 0 | 15 | 010 |
| 0 | 20 | 011 |
| 1 | 25 | 100 |
| 1 | 35 | 101 |
| 1 | 60 | 110 |
| 1 | 80 | 111 |

Figure 9 (Quantization Table for the Base Station)

| Received Bits | Frame Eraser (FE) | RxQual |
|---|---|---|
| 000 | 0 | 2 |
| 001 | 0 | 7 |
| 010 | 0 | 12 |
| 011 | 0 | 17 |
| 100 | 1 | 22 |
| 101 | 1 | 29 |
| 110 | 1 | 37 |
| 111 | 1 | 65 |

RATE ADAPTATION FOR USE IN ADAPTIVE MULTI-RATE VOCODER

CROSS-REFERENCE TO RELATED APPLICATIONS

This application is a continuation of U.S. Ser. No. 11/566,006, filed on Dec. 1, 2006, now U.S. Pat. No. 7,558,359, which is a continuation of U.S. Ser. No. 10/124,464, filed on Apr. 16, 2002, now U.S. Pat. No. 7,164,710, which is a continuation of U.S. Ser. No. 09/080,013, filed on May 15, 1998, now U.S. Pat. No. 6,529,730.

BACKGROUND OF THE INVENTION

1. Field of the Invention

The present invention relates generally to wireless communication systems. More particularly, the present invention relates to a wireless communication system having an adaptive multi-rate (AMR) vocoder to maximize the voice quality while minimizing the level of channel coding.

2. Description of the Related Art

As the use of wireless communication systems become increasingly popular, a variety of methods are being developed to increase the number of mobile communication devices a system can simultaneously service. The Global System for Mobile Communications (GSM), also referred to as the Group Speciale Mobile, is one example of a wireless communication system which is constantly being adapted to increase the number of simultaneous users.

The GSM system is modeled after standards created by the European Telecommunications Standards Institute (ETSI) and operates between a telecommunication base station (BS) and a mobile station (MS) using a pair of frequency bands in a frequency division duplex (FDD) configuration. The first frequency band occupies the frequency spectrum between 890 to 915 Megahertz (MHZ), and the second frequency band occupies the frequency spectrum between 935 to 960 MHZ. Typically, the first frequency range is used for the lower power transmissions from the MS to the BS, and the second frequency range is used for the higher power transmission from the BS to the MS. Each frequency range is divided into 125 channels with 200 Kilohertz (kHz) spaced carrier frequencies.

The GSM communication system is a time-division-multiple-access (TDMA) system. In the GSM TDMA system, each carrier frequency is divided into eight (8) time slots. Because each MS is assigned a single time slot on one channel in both the first frequency range and the second frequency range, a total of 992 MS may use the BS at the same time.

A typical speech channel for GSM communication is sampled at 8 KHz and quantized to a resolution of 13 bits, providing for the digitization of speech ranging from 0-4 KHz by a voice encoder, also referred to as a vocoder. The 13 bits are then compressed by a factor of eight (8) in a full-rate vocoder to a voice data digital bit stream of 13 kilobits per second (Kbit/s). Because GSM uses a complex encryption technique with interleaving and convolution coding, a high degree of system integrity and bit error control are achieved. In fact, despite multi-path and co-channel interference, the GSM system may continue to operate despite a carrier-to-interference ratio (C/I) as low as 9 dB, in comparison to a typical advanced mobile phone service (AMPS) analog system requiring a maximum C/I of 17 dB.

Depending upon the topography of an area, a typical BS may provide communication services to any number of MSs within a radius up to 35 Kilometers. Consequently, with the rising popularity of mobile communication devices, it is often the case that during peak periods of use, such as rush-hour traffic, all channels are fully occupied and the BS is not able to provide communication services all of the MS in its region.

In order to avoid the inability to service all MS within a region, the ETSI has contemplated a modification of the GSM standard to increase the density of the communication channels. However, because the allocated frequency spectrum of 25 MHZ with 125 separate 200 KHz carrier channels is fixed, a current approach to increasing the density of the communication system is to increase the number of users per channel. In general, this density increase is achieved by decreasing the amount of digital information which is sent to and from each BS, thereby allowing each BS to support more users in a 200 kHz frequency band.

One approach to decreasing the amount of digital information passing between a BS and a MS is to decrease the vocoder rate of the digital voice data from a full-rate vocoder rate of 13 kilobits per second (Kbits/s) to a half-rate vocoder rate of 5.6 Kbits/s. Although the ability currently exists to effectively double the number of users on any one communication channel from eight (8) to sixteen (16) by using the half-rate vocoder, it has been found that the 5.6 Kbits/s vocoder rate is barely acceptable as the speech quality is significantly decreased.

In light of the above, it would be advantageous to provide a communication system that provides for the user density of a half-rate vocoder system, while providing the voice quality approaching or exceeding that of a full-rate vocoder system. It would also be advantageous to provide a communication system that provides for the modification of the communication channel to incorporate only the amount of channel coding necessary to achieve a reliable communication link between the MS and the BS.

SUMMARY OF THE INVENTION

Broadly, the present invention provides for a wireless communication system having the ability to increase or decrease the vocoder rate and channel coding in response to the level of interference present on the wireless communication channel, resulting in a communication channel having the best possible speech quality. This may be accomplished in either a full-rate or half-rate GSM communication system by decreasing the amount of channel coding during periods of low channel interference to allow transmission of more speech information, representing a higher vocoder rate and resulting in a higher speech quality. During periods of higher channel interference, the amount of channel coding may be increased to the maximum channel coding allowed in a GSM communication network. This increased channel coding provides for consistent and reliable call handling, and results in a lower vocoder rate having a lower speech quality.

In an embodiment of the present invention, a time-division-multiple-access (TDMA) communication system includes a base station (BS) and at least one mobile station (MS), each transmitting and receiving an analog radio-frequency signal carrying digitally coded speech. The speech is digitally encoded using a vocoder which samples a voice signal at different encoding rates. Alternatively, the speech may be encoded using a number of different vocoders simultaneously, with each vocoder having a different encoding rate. During periods when the radio-frequency channel is experiencing high levels of channel noise or interference, the encoded voice channel having a lower encoding rate is chosen. This lower-rate encoded voice is combined with the high degree of channel coding necessary to ensure reliable transmission. When the radio-frequency channel is experiencing low levels of channel interference, less channel coding is necessary and the vocoder having a higher encoding rate is used. The high-rate encoded voice is combined with the lower degree of channel coding necessary to ensure reliable transmission. The appropriate level of channel coding necessary for reliable transmission is determined by various channel metrics, such as frame erase rate and bit error rate.

The determination of the appropriate vocoder rate and level of channel coding for both the uplink and downlink may be determined centrally at the base station, with the vocoder rate and level of channel coding for the uplink being relayed to the mobile station. Alternatively, the appropriate vocoder rate and level of channel coding for the downlink may be determined by the mobile station, and the appropriate vocoder rate and level of channel coding for the uplink may be determined by the base station.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 8 is a quantization table identifying the bits transmitted from the mobile station to the base station in order to provide the base station with the necessary channel metric information to determine the mobile stations vocoder rate;

FIG. 9 is a quantization table identifying the received bits which correspond to the channel quality metrics made by the mobile station.

DETAILED DESCRIPTION

System Architecture of a Preferred Embodiment

Figure 1:
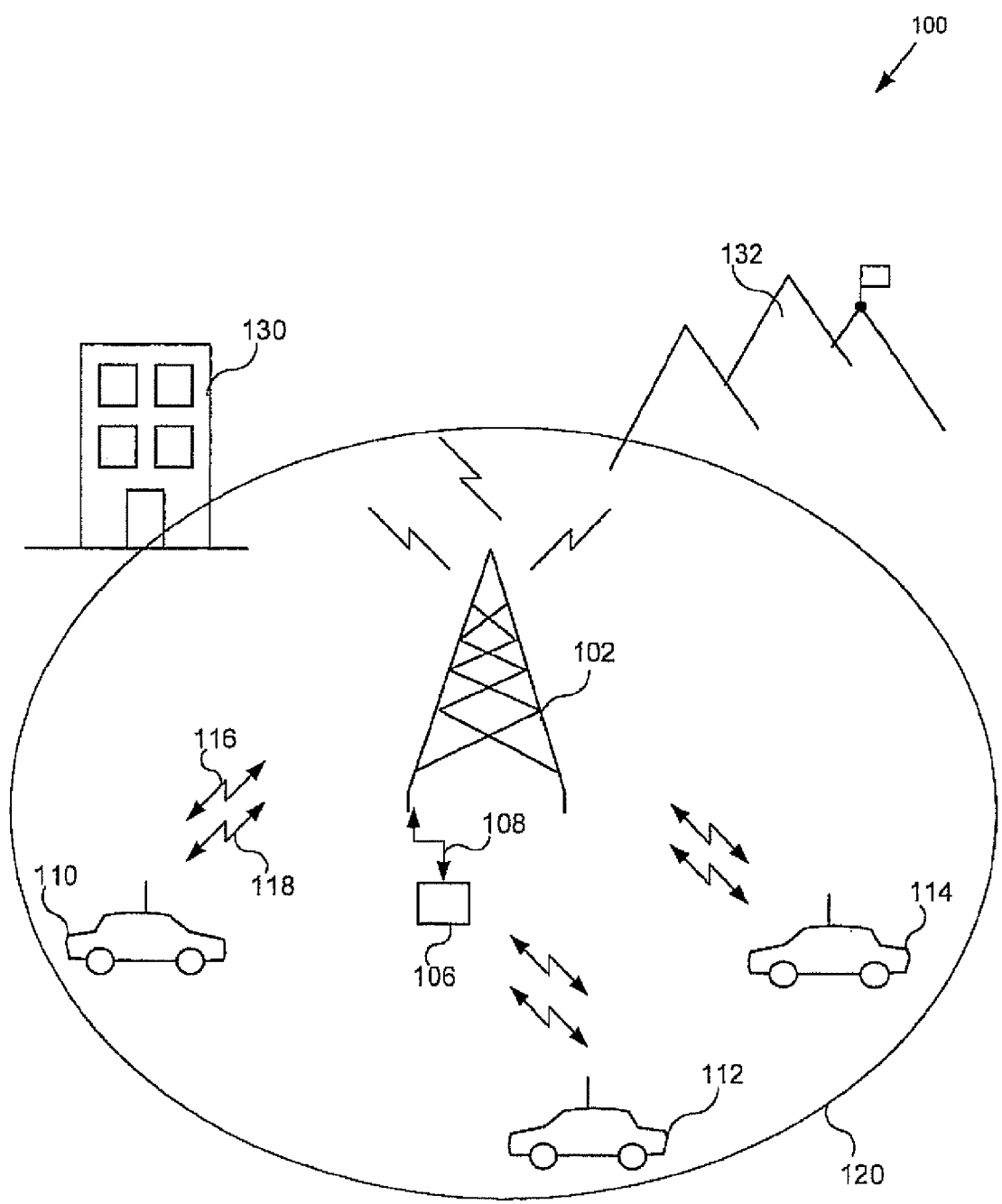
FIG. 1 is a diagram of a typical wireless telecommunication system, including a base station and a number of mobile stations.

Referring first to FIG. 1, an exemplary communication system of the present invention is shown and generally designated 100. Communication system 100 operates in compliance with the GSM communication standard which includes a time-division-multiple-access (TDMA) communication scheme. In general, a TDMA communication system provides for the transmission of two or more data channels over the same radio-frequency channel by allocating separate time intervals for the transmission of each data channel. In a GSM system, each 200 kilohertz (kHz) radio-frequency channel is divided into repeating time frames, each frame having a duration of 4.615 milliseconds. Each frame contains eight (8) time intervals (also called "slots") each having a duration of 577 microseconds (4,615/8) and assigned to a different user.

Communication system 100 includes a base station (BS) 102 which receives signals from a mobile switching center (MSC) 106 via communication channel 108. This communication channel includes telephone and/or digital information which may typically originate from land-based telephone systems. Base station 102 transmits information to, and receives information from, mobile stations (MS) 110, 112, and 114 which are within cell 120. Cell 120 is a geographical region within which all mobile stations communicate with the base station 102. Typically, these cells range may have radii ranging from twenty-five (25) to thirty-five (35) kilometers, and may include such geographical disturbances such as buildings 130 or mountains 132. As used herein, the term "information" shall be defined to include digital data, encrypted digital data, convolutionally coded, soft-coded, and/or hard-coded data, digital bits or a bit stream, or any other data type known in the art.

Because a GSM-based communication system operates with paired frequency bands in a frequency-division-duplex (FDD) mode, base station (BS) 102 sends information to the mobile station (MS) 110 over a first radio-frequency channel 116, typically in the 890 to 915 MHZ range and referred to as the "downlink," and mobile station 110 sends information to the base station 102 over a second radio-frequency channel 118, typically in the 935 to 960 MHZ range and referred to as the "uplink." Although a GSM-based communication system operates using two frequency bands, it is nonetheless possible to implement the present invention in a system where both the BS and MS transmit and receive over the same radio-frequency channel.

Communication system 100 may support a number of mobile stations (MSs) 110, 112, and 114. In fact, under the GSM standard, each 25 MHZ frequency band is divided into 125 channels with 200 Kilohertz (KHz) spaced carrier frequencies. With each carrier frequency supporting eight (8) separate users, a single GSM communication system may support nearly one thousand (1,000) simultaneous users.

Given the high possible number of simultaneous users contributing to co-channel interference, and the presence of atmospheric and geographical sources of interference, there are periods of time during which a considerable amount of channel noise and interference is present on the communication system 100. Moreover, the presence of buildings 130 and mountains 132 result in multi-path distortion which further degrade the reliability of transmissions through the communication system 100. Additionally, because each MS may be moving in a different direction with respect to the BS, either towards or away from the BS at speeds up to 250 kilometers-per-hour (156 miles-per-hour), the possibility that a communication link will be temporarily or permanently disrupted is even higher.

In an attempt to minimize the deleterious effects of channel noise and interference on both the uplink and downlink communication channels, a significant amount of channel coding is added to the digital voice data. Channel coding is generally defined to include the process of combining the encoded digital voice data from the vocoder, with any redundant data, parity data, cyclic-redundant-checking (CRC) or other check data necessary to ensure the reliable transmission of the voice data. The code rate is the ratio of data bits to total bits (k/n), and is typically just over one-half (½) in an ordinary GSM-based system with full-rate vocoders, and just below one-half (½) in a system with half-rate vocoders.

During the channel coding process, the introduction of the necessary error correction, redundant data, parity data, CRC or check data is accomplished by convolutionally coding the digital voice data from the vocoder, with the necessary channel coding data. This results in a convolutionally encoded digital data stream which includes a mixture of voice data and channel coding. As will be more thoroughly discussed in conjunction with FIG. 2, this digital data stream is modulated and amplified for transmission over a radio-frequency channel. Upon reception of the modulated digital data stream, the data stream is channel de-modulated and the voice data and channel coding is convolutionally decoded and separated.

During periods with high levels of channel noise, the introduction of significant channel coding provides for an increased reliability of the communication channel. On the other hand, a data stream containing a significant amount of channel coding information limits the amount of voice data which can be transmitted, and during periods of low channel noise, results in an inefficient use of the communication channel. Consequently, the present invention monitors the current level of channel noise, and either increases the amount of channel coding to improve channel reliability, or decreases the amount of channel coding to provide for the transmission of more voice data.

Although the current GSM-based communication systems dictate a maximum vocoder rate of 13 Kbits/s for a full-rate vocoder system, the present invention contemplates a much higher maximum vocoder rate up to the bandwidth limitation of the wireless communication channel itself. For instance, if the current level of channel noise or interference is minimal, it is possible to provide a communication link having virtually no channel coding and thus providing for a voice data rate of 22 Kbits/s. This would correspond to a voice bandwidth over 4 kHz, resulting in a voice channel having a frequency range and corresponding voice quality well beyond that of a traditional 4 kHz voice bandwidth.

Transceiver Architecture

Figure 2:
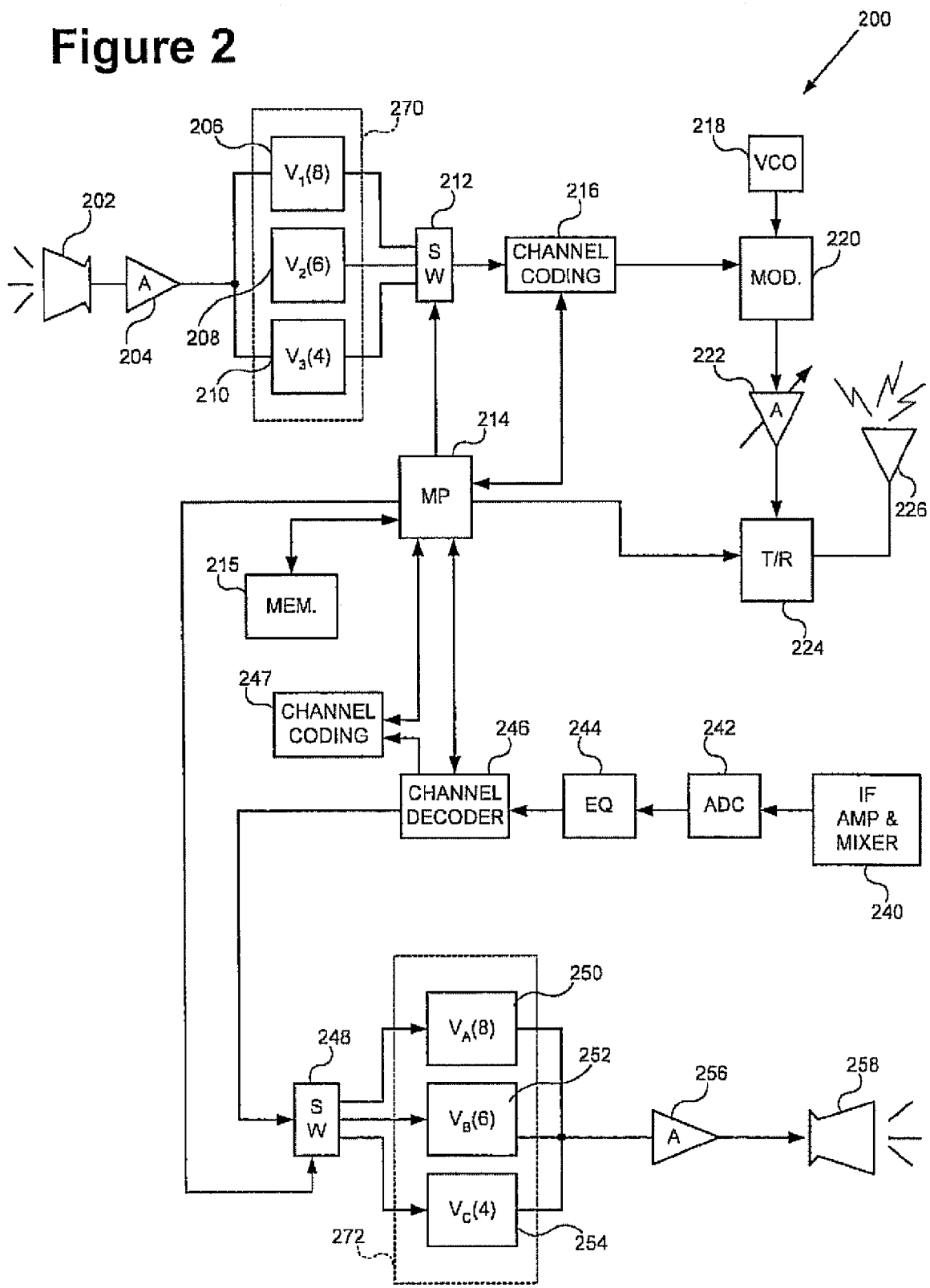
FIG. 2 is a schematic diagram of the hardware of a typical wireless transceiver of the present invention and includes three separate vocoders, each having a different vocoder rate.

Referring now to FIG. 2, a circuit diagram of a transceiver of one embodiment of the present invention is shown and generally designated 200. The transmitter portion of circuit 200 includes a microphone element 202, such as an electret-type microphone, that receives an acoustic signal, such as a user's voice, and converts the acoustic voice signal to an analog electrical signal. This analog electrical signal passes through amplifier 204 for amplification and filtering, and is supplied to the inputs of three (3) separate voice encoders, or vocoders 206, 208, and 210.

A vocoder is an analog-to-digital converter (ADC) which is created especially for the digital encoding and compression of analog voice data. Vocoders are designed around high speed digital signal processors (DSPs) and use a form of linear predictive coding which is intended to model the human vocal chords in order to produce realistic synthetic speech with the minimum of memory. In a GSM communication system with full-rate vocoders, voice data is sampled at the rate of 8 kHz and quantized to a resolution of thirteen (13) bits and compressed to a bit rate of 13 Kbits/s. In a GSM communication system with half-rate vocoders, voice data is sampled at the rate of 8 kHz and quantized to a resolution of thirteen (13) bits and compressed to give a bit rate of 5.6 Kbits/s. 11

In the present invention, vocoders 206, 208, and 210 each receives the amplified voice signal from amplifier 204 and each vocoder is continuously encoding the acoustic voice signals at different rates. For example, vocoder 206 may encode the voice signal at a vocoder rate of 8 Kbits/s, vocoder 208 may encode the voice signal at a lower vocoder rate of 6 Kbits/s, and vocoder 210 may encode the voice signal at an even lower vocoder rate of 4 Kbits/s. The particular vocoder rates discussed herein are merely exemplary, and it is to be appreciated that a vocoder of virtually any rate may be used, so long as the representative digital data rate is capable of being transmitted over the radio-frequency communication channel.

The outputs from vocoders 206, 208 and 210 are fed into switch 212 which is controlled by processor 214 having a memory storage 215. Processor 214 in the present embodiment is a microprocessor. However, processor 214 may instead be any conventional single or multi-chipped microprocessor, digital signal processor, microcontroller, or any other suitable digital processing apparatus known in the art. Memory storage 215 in the present embodiment may include an electrically erasable programmable read-only-memory (EEPROM), read-only-memory (ROM), random-access-memory (RAM), diskettes or other magnetic recording media, optical storage media, or any combination thereof. Electronic instructions for controlling the operation of processor 214, in the form of program code, may be stored in memory storage 215.

Based upon a predefined selection process, described in greater detail below, processor 214 determines the proper vocoder rate and selects the output of the appropriate vocoder 206, 208 or 210 for passage through switch 212 to encoder 216. For example, if the voice signal is to be encoded at a full-rate of 8 Kbits/s, then the output of vocoder 206 would be selected by processor 214 and passed through switch 212. Alternatively, if the voice is to be encoded at the rate of 6 Kbits/s, the output of vocoder 208 would be selected. Encoder 216 receives the digital voice data from the vocoder and adds the level of channel coding corresponding to the vocoder rate selected.

Once passed through encoder 216, the now-encoded digital voice data is mixed with the analog output of voltage-controlled-oscillator (VCO) 218 to modulate the digital voice data onto a carrier frequency in modulator 220. Modulator 220 modulates a gaussian-minimum-shift-key (GMSK) signal on a radio-frequency carrier which is then passed through variable power amplifier 222 and through transmit/receive switch 224 to antenna 226 for transmission. A GMSK signal incorporates gaussian-shaped pulses and is intended improve the resilience of the communication channel to co-channel interference. As an alternative to GMSK, other modulation methods known in the art may be used, such as BPSK, QPSK, or FSK.

Control of transmit/receive switch 224 is accomplished by processor 214 in a method well known in the art. In single antenna transceivers, it is often necessary to switch the antenna between the transmitting and receiving portions of the circuitry in order to isolate the sensitive receiver electronics from the higher power signal generated by the transmitter.

The receiver portion of circuit 200 begins with antenna 226 which receives an analog radio-frequency signal that is passed through transmit/receive switch 224 to intermediate-frequency (IF) amplifier and mixer 240. Mixer 240 removes the carrier frequency from the radio-frequency signal and passes the remaining analog signal to an analog-to-digital converter (ADC) 242. ADC 242 converts the received analog signal to a digital signal which is then passed through equalization block 244 where the digital signal may be filtered and the digital bit stream recovered, and to channel decoder 246.

As will be discussed in more detail below, processor 214 receives a signal, in the form of rate bits, from channel decoder 246. These rate bits identify the appropriate vocoder rate needed to decode the current voice data encoded in the received signal. Based upon the rate bits, processor 214 selects vocoder 250, 252, or 254 using switch 248, and the digital voice data from the decoded radio-frequency channel is passed from channel decoder 246, through switch 248, and to the appropriate vocoder 250, 252, or 254. For example, if the digital voice data was encoded at a full-rate of 8 Kbits/s, then processor 214 would operate switch 248 to send the digital voice data to vocoder 250 which, in the present embodiment, decodes at the full-rate of 8 Kbits/s. Vocoder 250 decodes the digital information received from channel decoder 246, and re-creates the original analog voice signal which is then passed through amplifier 256 and out speaker 258 to be heard by the user.

In an alternative embodiment, vocoders 206, 208 and 210 of circuit 200 may be replaced by a single vocoder (shown by dashed lines 270) having multiple encoding rates, or a variable encoding rate. For instance, the single variable-rate vocoder 270 may be capable of encoding acoustic signals from amplifier 204 at rates between 4 Kbits/s, and 8 Kbits/s as determined by processor 214. Similarly, vocoders 250, 252, and 254 may be replaced by a single variable vocoder 272.

Although the present invention is discussed in conjunction with a TDMA communication system, it is to be appreciated that the use of a TDMA communication scheme is merely exemplary, and the present invention may be practiced on any number of alternative communications systems, such as code-division-multiple-access (CDMA) and frequency-division-multiple-access (FDMA), for example.

Figure 3:
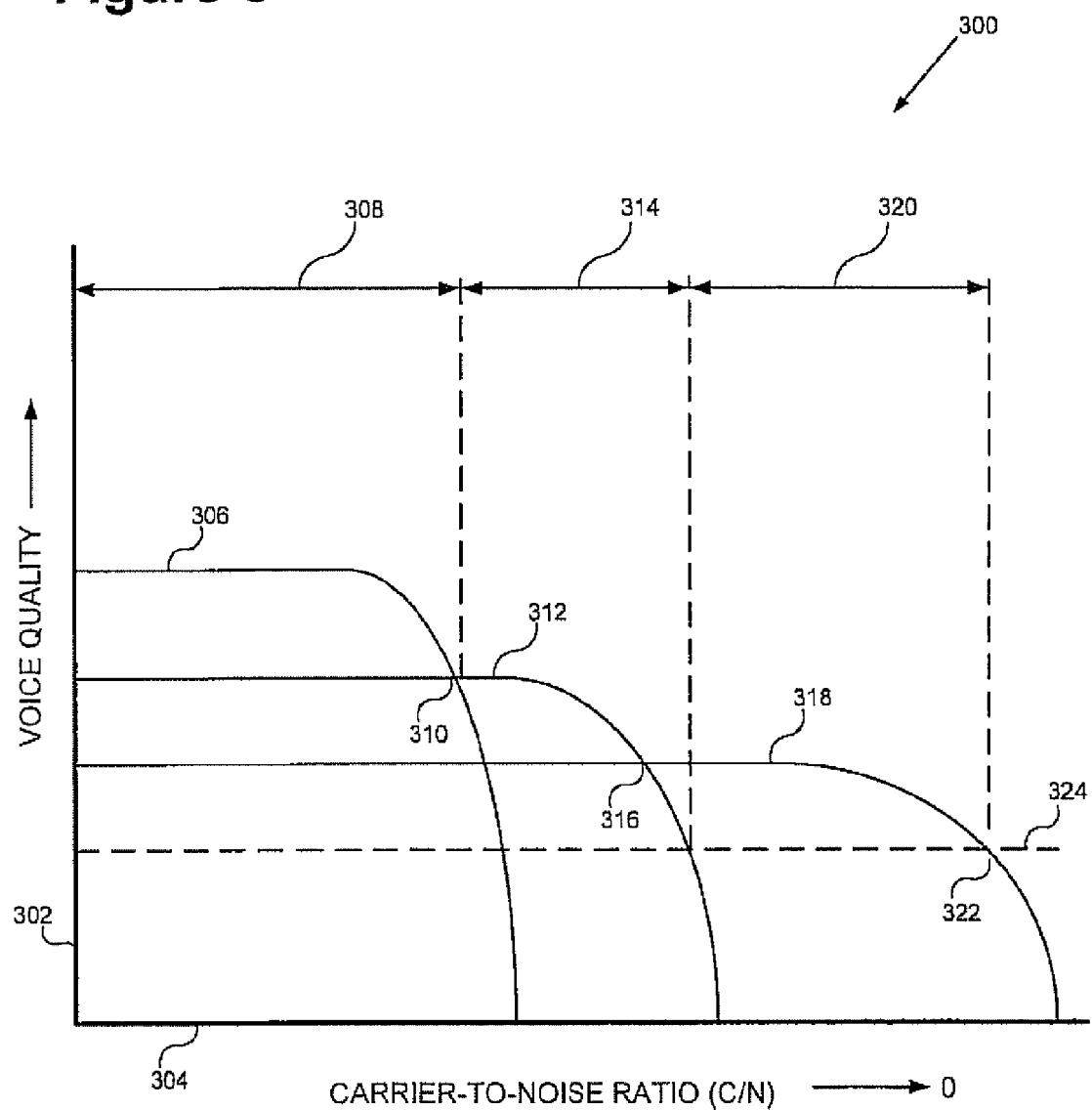
FIG. 3 is a graph of the relative performance characteristics of a wireless communication system implementing a variable vocoder rate.

Referring now to FIG. 3, a graphical representation of system performance is shown and generally designated 300. Graph 300 includes a vertical axis 302 labeled "Voice Quality" and a horizontal axis 304 labeled "Carrier-to-Noise Ratio (C/N)." As discussed herein, the term C/N is considered to include a carrier-to-interference (C/N) portion. In summary, graph 300 represents the performance of communication systems based on the level of channel coding and corresponding vocoder rates. More specifically, three separate curves are shown and each represents the performance of a particular system configuration. For example, graph 306 represents the performance of a communication system using a full-rate vocoder, with a minimum level of channel coding. As can been seen, curve 306 begins at a higher initial voice quality, but as the C/N decreases, the level of interference due to the lower level of channel coding eventually causes a marked decrease in the voice quality.

Similarly, curve 312 represents the performance of a communication system using a mid-rate vocoder with a corresponding mid-level of channel coding. Such a mid-rate vocoder rate could be 6 Kbits/s. Although the initial voice quality shown by curve 312 is maintained for a longer period, it too suffers from the interference caused by the lower level of channel coding.

Finally, curve 318 represents the system performance of a communication system using a low-rate vocoder with a corresponding higher level of channel coding. In this case, the high level of channel coding provides for a continuous communication link despite a significant decrease in the C/N, however, the voice quality is lower than either the system shown by curve 306 or 312.

In order to maintain the highest level of voice quality possible, despite the decreasing C/N, the present invention changes the voice encoding rate and corresponding level of channel coding in order to maximize the voice quality. For example, in environments where the C/N ratio is high, the system uses the highest possible vocoder rate and lowest possible amount of channel coding. In this situation, because of the low levels of noise and interference on the communication channel, there is little need for heavy channel coding to ensure the communication channel is sustained. However, as the C/N ratio begins to decrease, at the precise instant when curve 306 crosses curve 312, shown as intersection 310, the communication system of the present invention changes the vocoder rate and corresponding channel coding to the rate associated with curve 312. In this manner, the highest possible level of voice quality is maintained, even though there is a higher level of channel coding present.

Similarly, as the voice quality of the system represented by curve 312 drops to the level of the system represented by curve 318, shown at intersection 316, the communication system of the present invention again changes the vocoder rate and corresponding channel coding to the rate associated with curve 318. In this manner, the voice quality for the communication channel is always maximized.

In the event the channel noise and interference exceeds the maximum allowable level and results in the voice quality being sufficiently poor so as to pass below the threshold 324, shown at intersection 322, the communication channel is terminated. This terminated communication channel is perceived by the user as a "dropped call." Once terminated, system 100 must be re-initialized and a communication channel must be re-established between the BS 102 and the MS 110.

Graph 300 has been divided into three (3) regions 308, 314, and 320, representing the maximized voice quality. A communication channel using the present invention will operate within each of these regions as needed to maximize the voice quality. For example, for a communication channel which is initiated at a vocoder and channel coding rate in region 314 corresponding to curve 312, a momentary decrease in the C/N may cause the system to switch to a vocoder and channel coding rate in region 320 corresponding to curve 318. However, once the C/N returns to its original value, the system will shift back to the vocoder and channel coding rate of region 314 corresponding to curve 312. In this manner, system 100 may constantly move between regions 3081 314 and 320 to maximize the voice quality of the communication channel.

Graph 300 has been shown to include three (3) separate curves representing three (3) different vocoder rates and corresponding levels of channel coding. However, it should be appreciated that the selection of three (3) vocoder rates is merely exemplary, and virtually any number of vocoder rates may be used in the present invention. Moreover, in a system of the present invention incorporating a vocoder having a variable vocoder rate, virtually any combination of vocoder rate and channel coding may be accomplished within the system limits, ranging from a maximum vocoder rate with no channel coding, to minimum vocoder rate with maximum channel coding.

Referring now to FIG. 41 a diagrammatic representation of the construction of a GSM communication channel is shown and generally designated 400. Representation 400 includes a series of three (3) speech blocks 402, 404, and 406. Speech block 402 includes a channel coding portion 408 and a voice data portion 410. A speech block represents the digital information which has been generated by the vocoder 206, 208 or 210 and channel coder 216 of circuit 200. Accordingly, the digital information within a speech block includes both the voice data and channel coding which has been determined necessary for the reliable transmission of the information. While FIG. 4 identifies a channel coding portion 408 and a voice data portion 410 as separate portions of speech block 402, it is to be appreciated that such identification is merely for discussion purposes, and the voice data is actually interleaved with the channel coding to create a data stream having 228 bits.

Speech blocks 402, 404 and 406 are each shown having different ratios of channel coding portions and voice data portions. More specifically, speech block 402 is shown having a larger proportion of channel coding 408 to a smaller proportion 412 of voice coding 410. Speech block 404, on the other hand, has approximately an even proportion 418 of channel coding 414 to voice coding 416. Speech block 406 has a larger proportion 424 of channel coding 420 to voice coding 422. In any case, from comparing speech blocks 402, 404, and 406, it can be seen that the ratios of channel coding to voice coding may change, and even though three separate ratios have been shown in FIG. 4, virtually any proportion 412, 418, and 424 may be implement with the present invention.

In addition to having a variable quantity of voice data and channel coding, a speech block may also be encoded with a number of rate bits 413. These rate bits 413 represent the particular vocoder rate with which the voice data is encoded. For example, in a communication system where vocoder rates may be varied, rate bits 413 provide the necessary vocoder rate information to successfully decode the voice data. In a preferred embodiment, the rate bits are positioned within the speech block 402, but are not convolutionally encoded with the voice data and channel coding. Rather, the rate bits 413 are "soft-coded" into the speech block 402 such that they can be extracted without the need for convolutionally decoding the speech block. The term "extract" in the present context may include convolutionally decoding, soft-decoding, hard-decoding, or any other manner of retrieving the digital information from the data stream known in the art.

The "soft-coding" of the rate bits may be accomplished by placing a series of bits within a particular location of the speech block. For example, rate bits 413 may be placed at bit positions 70, 71, and 72 of speech blocks 402, 404 and 406. By positioning the rate bits at consistent locations within each of the speech blocks, it is not necessary to decode the block to determine the value of the rate bits. Instead, the value of the bits in bit positions 70, 71 and 72 could be determined simply by scanning those bits in the serial bit stream. Additionally, it is possible to place the rate bits in more than one location within each speech block, providing for a measure of error correction. For example, rate bits 413 could occur in three separate locations within speech block 402, allowing the averaging of the bits within the three separate locations in order to provide the best approximation of the rate bits despite any transmissions errors.

In a preferred embodiment, rate bits 413 may represent a three-bit binary value corresponding to eight distinct vocoder rates. Table 1 below identifies such a table of eight distinct vocoder rates based upon three rate bits. As can be seen from Table 1, the rate bits 413 may be assigned any vocoder rate within the vocoder range of the communication system.

TABLE 1

Rate Bits for Corresponding Vocoder Rates

| Rate Bits | Vocoder Rate (Level) | Vocoder Rate (Kbits/s) |
|---|---|---|
| 000 | Level 1 | 3.0 Kbits/s |
| 001 | Level 2 | 4.0 Kbits/s |
| 010 | Level 3 | 5.0 Kbits/s |
| 011 | Level 4 | 6.0 Kbits/s |
| 100 | Level 5 | 7.0 Kbits/s |
| 101 | Level 6 | 8.0 Kbits/s |
| 110 | Level 7 | 9.0 Kbits/s |
| 111 | Level 8 | 10.0 Kbits/s |

There are three (3) rate bits identified in Table 1, however, the number of rate bits may vary depending upon the total number of vocoder rates available. For instance, if only two rates are available, a single bit would be needed, with a bit value of "0" indicating one rate, and the bit value of "1" indicating the other rate. Similarly, if only four rates were available, two rate bits would be needed, with the bit values of "00" indicating a first vocoder rate, bit values of "01" indicating a second vocoder rate, bit values of "10" indicating a third vocoder rate, and bit values of "11" indicating a fourth vocoder rate.

Although Table 1 includes a series of eight (8) vocoder rates spaced 1 Kbits/s apart, it is to be appreciated that it is not necessary for the vocoder rates to be evenly distributed. In fact, it would be advantageous for the communication system of the present invention to have a number of vocoder rates within the operating range most frequently experienced by the system. For example, if the communication system noise and interference characteristics indicate that the vocoder rate would typically be 6 Kbits/s, then it might be advantageous to provide several vocoder rates within the 5 to 7 Kbits/s region in order to maximize the voice quality. In such an environment, a series of eight (8) vocoder rates might include the following vocoder rates: 4.0 Kbits/s, 5.0 Kbits/s, 5.5 Kbits/s, 6.0 Kbits/s, 6.5 Kbits/s, 7.0 Kbits/s, 8.0 Kbits/s, and 9.0 Kbits/s. Using these vocoder rates would allow the communication system to adjust the vocoder rate just slightly in order to provide the finest possible voice quality during periods of slight fluctuations in the channel noise and interference levels, while retaining the ability to significantly change the vocoder rate for periods of heavy channel noise and interference.

Once the voice data has been encoded with the necessary channel coding, and any rate coding, to form speech blocks 402, 404, and 406, each speech block is divided into four (4) sub-blocks. For example, "A" speech block 402 is split into sub-blocks "$A_1$" 432, "$A_2$" 434, "$A_3$" 436, and "$A_4$" 438. Likewise, "B" speech block 404 is split into sub-blocks "$B_1$" 440, "$B_2$" 442, "$B_3$" 444, and "$B_4$" 446, and "C" speech block 406 is split into sub-blocks "$C_1$" 448, "$C_2$" 450, "$C_3$" 452, and "$C_4$" 454. In this manner, the 228 bit data stream in the speech block is broken into four (4) sub-blocks of 57 bits each.

Using a combination of sub-blocks, a multi-frame 476 is constructed which includes a continual string of data frames, with each data frame having eight (8) time slots 478 1480 and 482. As shown by mapping lines 462 and 464 in FIG. 4, frame 478 is constructed from the "$A_3$" sub-block 436 and the "$B_1$" sub-block 440. This combination of sub-blocks into frames 478, 480 and 482 is called "frame-interleaving" and is intended to create a more robust communication channel.

In addition to this frame-interleaving, the even bits within frame 478 are comprised of the data bits of the "$B_1$" sub-block 440, and the odd bits within frame 478 are comprised of data bits of the "$A_3$" sub-block 436. This even bit/odd bit combination is called "bit-interleaving" and results in the distribution of a single speech block over four contiguous frames. This distribution provides for an improved fault tolerance for the communication system, and in circumstances where the noise level and interference level are high, results in a more resilient communication channel.

In addition to the combination of sub-blocks 438 and 442, frame 480 is also encoded with communication system specific coding. For example, using the GSM-based communication system of FIG. 1, frame 480 is encoded with three (3) leading "tail bits" 482, a first "encoded voice" bit stream 484 of fifty-seven (57) bits, a single "flag" bit 486, a twenty-eight bit "training sequence" 488, a second "flag" bit 490, a second "encoded voice" bit stream 492 of fifty-seven (57) bits, three (3) trailing "tail bits" 494, and an eight and one-quarter (8¼) bit "guard" period 496. The first and second "encoded voice" bit streams 484 and 492 represent the encoded voice which was present in the "B$_1$" sub-block 440 and the "A$_3$" sub-block 436, which included both the voice data, channel coding, and rate bits.

Because Doppler shift and multi-path echoes in system 100 can affect the received signal quality, each TDMA frame must include training sequence 488, also called training bits. The receiver in system 100 compares these training bits with a known training pattern, and from this deduces the transfer function of the propagation path. An adaptive filter is then created within processor 214 to perform the inverse transfer function, thus canceling any unacceptable distortion. This adaptive filtering is well known in the art, and is thus not discussed in more detail here.

Because of the frame-interleaving and bit-interleaving employed in this GSM-based communication system 100, it is not possible to decode the voice information without re-assembling the sub-blocks 432-454 from successive frames 478-482 in multi-frame 476. Consequently, it is necessary for the digitally encoded voice information to be temporarily stored, such as by temporarily placing the encoded voice information into storage 215 of circuit 200. Once a sufficient number of frames has been stored in memory storage 215, the sub-blocks are then re-assembled and the voice data is decoded from the re-constructed speech blocks, removing all channel coding, and sent through switch 248 to vocoders 250, 252, and 254.

A full-rate GSM-based system would assign each time slot within a frame to a different user. For example, each of the eight (8) time slots within a frame would be assigned to eight (8) different users. In a half-rate GSM-based system, the frame and slot timing remains the same, but instead of a user being assigned a time slot in every frame, the user is assigned a time slot in every other frame.

Operation

Communication Channel Metrics

The operation for the present invention includes the modification of the vocoder rate and level of channel coding to provide the best possible voice quality, while ensuring a reliable communication channel. In order to determine the appropriate level of channel coding necessary to provide reliable communication, a number of channel quality metrics are considered by the present invention. Defined generally, these channel quality metrics include characteristics of the communication channel which may be measured, and by continually measuring these channel quality metrics, an accurate evaluation of the channel quality may be made.

One channel metric used to evaluate the quality of the communication channel is the uncoded Bit Error Rate (BER). The uncoded BER of a communication channel is defined as the ratio of the number of bits in a data stream which are improperly demodulated to the total number of bits transmitted. In general, a bit error is caused when the noise power level in a communication system becomes comparable to the energy level in each bit transmitted Consequently, in a system with a small channel-to-noise ratio (C/N, bit errors are more likely. Conversely, in a system with a large channel-to-noise ratio, bit errors are less likely. Thus, on a fundamental level, the rate of occurrence of bit errors, or the BER, provides an overall system quality metric.

An additional metric which may be used to evaluate the quality of a communication channel is the RX Quality (RXQ) indicator. The RXQ indicator as generally known in the industry is assigned a value by the network, indicating the quality of the received signal based upon the current BER. Table 2 below includes values for a typical network-determined BER with corresponding RXQ values. This table, however, represents an average received quality, and not an instantaneous RXQ value.

TABLE 2

GSM Standards for RX Quality Metric

| RX Qual | Corresponding Bit Error Rate | Range of Actual BER (%) |
|---|---|---|
| 0 | Below 0.2 | Below 0.1 |
| 1 | 0.2 to 0.4 | 0.26 to 0.30 |
| 2 | 0.4 to 0.8 | 0.51 to 0.64 |
| 3 | 0.8 to 1.6 | 1.0 to 1.3 |
| 4 | 1.6 to 3.2 | 1.9 to 2.7 |
| 5 | 3.2 to 6.4 | 3.8 to 5.4 |
| 6 | 6.4 to 12.8 | 7.6 to 11.0 |
| 7 | above 12.8 | above 15 |

The GSM standards for the RXQ of Table 1 is an average value measured during a predefined period of time. However, because the present invention contemplates an immediate response to a decrease in the RXQ value, it is necessary to determine the RXQ metric on a block-by-block basis. This block-by-block calculation of RXQ', for example, would be made within the MS for the downlink, and within the BS for the uplink.

In the present invention, an RXQ' metric is defined and is dynamically measured by re-encoding the decoded voice data coming out of the convolutional decoder, and comparing them against the received bits. The RXQ' value represents the number of bits different between the received bits and the re-encoded bits per block. The RXQ' consequently provides a combined indication of bit error rate and receiver quality for each block.

Figure 4:
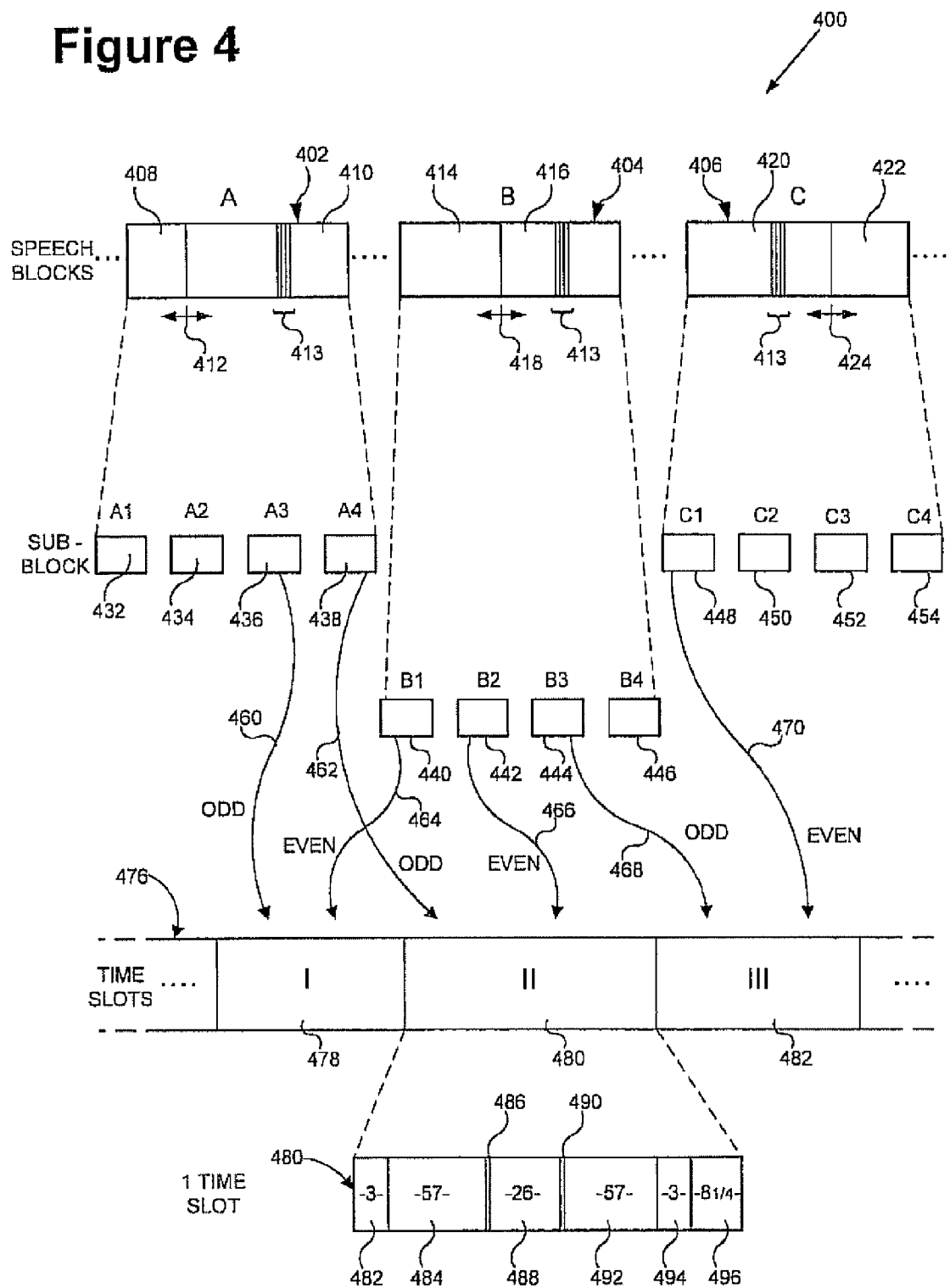
FIG. 4 illustrates the coding, combination and interleaving of speech blocks into a frame, and the variation of the ratio of channel coding to speech coding for various levels of radio-frequency channel noise and interference.

Referring briefly to FIGS. 2 and 4, the determination of the RXQ' metric is accomplished by decoding the voice data from a speech block 402 within a received frame 480, and re-coding the voice data for comparison to the encoded received data. The determination of the RXQ' metric takes place within circuit 200 by receiving a transmitted frame 480 and passing the frame through transmit/receive switch 224 to intermediate frequency (IF) amplifier and mixer 240, through ADC 242 and equalizer 244, to channel decoder 246. In channel decoder 246, the frame 480 is decoded to the original speech block which is then passed to storage 215 for later use. Following storage of the original speech block, all channel coding is removed to recover the original voice data which may also be stored in storage 215, or passed on through switch 248 to vocoders 250, 252 or 254 for conversion to audio.

Once the original voice data is recovered from channel decoder 246, the now-decoded voice data is then re-encoded through a convolutional coding process identical to that of the channel encoder 216 to exactly re-create the original coded speech block. This re-encoding may be accomplished using channel decoder 246, or the voice data may be passed through a separate channel coder 247. By comparing the original speech block stored in storage 215 with the newly re-coded speech block from channel coder 247, an estimated bit-error-rate may be determined. For example, by comparing the received speech block with the re-coded speech block, the existence of any error-correction which has taken place within channel decoder will become apparent. Consequently, this dynamic method of error detection is considerably more sensitive than other estimates of the BER, and may be done on a block-by-block basis.

An additional metric, SRXQ, is defined as the weighed sum of prior RXQ' measurements. The SRXQ metric is intended to introduce some history into the vocoder rate decision making process based on the receiver quality. In one embodiment, the RXQ' measurements for the prior five (5) blocks are considered in the SRXQ measurement. The prior RXQ' measurements are weighted in accordance with the following equation:

$$SRXQ = \text{SUM}(2^{K-1})(RXQ'(K+4));$$

where K=−4, −3, −2, −1, and 0, and where RXQ'(0) is the measured value for the most recent block.

An alternative channel quality metric, Frame Erase (FE), may be used to determine the overall quality of the channel. The FE metric represents the number of frames which have been determined to be corrupted, and consequently not used in re-generating the original voice data. In other words, the FE metric represents a count of the number of frames which have been erased per unit time. The decision to erase a frame may be made using a number of criterion. In a present embodiment, the determination to erase a frame is made based on the cyclic-redundancy-checking (CRC), also generally known as a "parity" check. Based on a CRC value which is decoded from the received frame, a frame is either used or discarded, avoiding the use of a frame which may have been improperly decoded or otherwise corrupted.

System Operation

Figure 5:
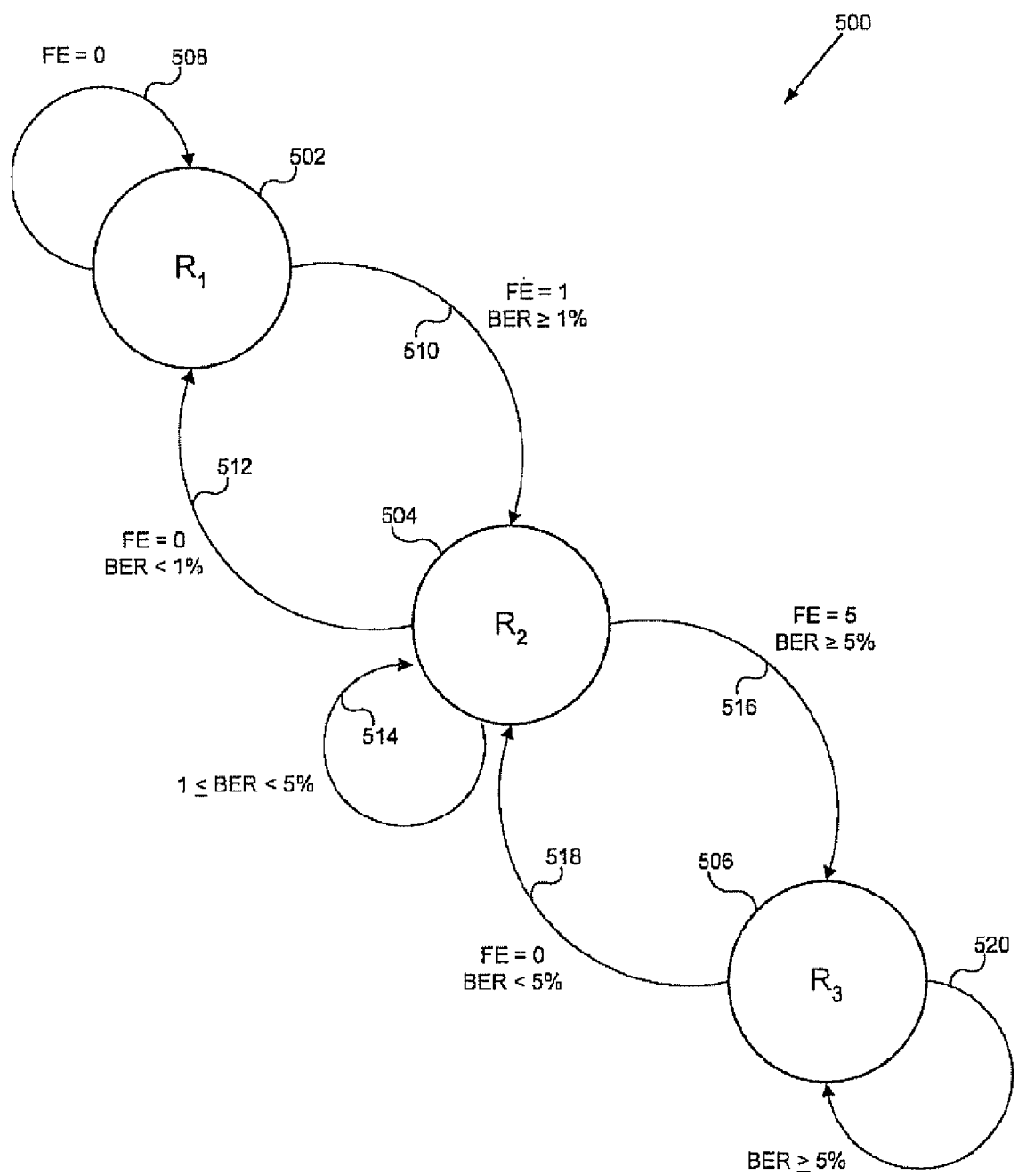
FIG. 5 is a state diagram illustrating the change of vocoder rate based upon the current status of the communication system, including the FE and BER metrics.

Referring now to FIG. 5, a state diagram is shown and generally designated 500. State diagram 500 represents the changes in vocoder and channel coding rates in response to changes in the communication system environment. For discussion purposes, it is assumed that the communication system is initially experiencing a high carrier-to-noise ratio (C/N), and thus the system is initially in state 502 having a relatively high vocoder rate of 8 Kbits/s, with a correspondingly low level of channel coding. In other words, state 502 is used in low-noise environments, such as where the carrier-to-interference ration (C/I) exceeds 19 dB, wherein the majority of digital information with a speech block may be voice data. System 100 will remain in state 502 so long as the FE metric remains at zero (0), as indicated by control path 508. This results in a communication system having a superior voice quality.

In the event that a frame is erased resulting in the FE metric becoming non-zero, the BER is computed to determine whether it meets or exceeds a threshold value. In the present embodiment, this threshold value is one percent (1%), meaning that if more than one bit out of a total bit stream of one hundred (100) bits is erroneous, the threshold is met or exceeded. Once the FE metric becomes non-zero and the BER is above the one percent (1%) threshold, the system changes to state 504 via control path 510.

State 504 is used in environments exhibiting moderate levels of noise and interference, and combines a mid-range vocoder rate of 6 Kbits/s with a moderate level of channel coding. In the current example, the vocoder and channel coding rate will remain at the mid-range of state 504 so long as the BER is greater-than-or-equal-to one percent (1%), and less than five percent (5%) (1% £ BER<5%). In this state, typically where the C/I is between 10 and 19 dB, the communication channel exhibits a reasonably good voice quality.

If after a period of time the communication environment improves and the FE metric returns to zero (0) and the BER becomes less than one percent (1%), the system returns to state 502 via control path 512. On the other hand, in the event the system environment becomes more noisy and the channel-to-noise ratio (C/N) becomes smaller, the FE metric will likely increase. If the FE metric increases to equal or exceed 5, and the BER metric is greater-than-or-equal-to 5 percent (5%), (FE>5 and 5% £ BER) the system passes to state 506 via control path 516. In this state, a higher degree of channel coding is implemented resulting in a corresponding lower vocoder rate of 4 Kbits/s. According to control path 520, the system will remain in state 506 so long as the BER is greater-than-or-equal-to 5% (5% £ BER), typically when the C/I is between 4 to 10 dB.

When the system is in state 506, and the communication environment improves causing the FE metric to decrease to zero (0) and the BER metric to decrease to less than five percent (5%), than the communication system will change to state 504 according to control path 518, thereby decreasing the level of channel coding and improving the voice quality of the system.

In the event the communication system is in state 506 and the FE and BER metrics continue to increase, the communication system may eventually discontinue the communication channel resulting in a "dropped call." In the present embodiment, the communication channel will be discontinued when the FE and BER rates exceed 20 and ten percent (10%), respectively, for example.

In order to ensure the proper operation of the system of the present invention, it is necessary that the metrics evaluated for determination of the system control between various states 502, 504, and 506 include a measure of hysteresis. For example, if no hysteresis were to be included between states 502 and 504, it would be possible for the system to oscillate rapidly between the two states, resulting in a vocoder rate and level of channel coding which varies from frame to frame. Although this continual vocoder change is possible with the system of the present invention, it is unnecessary and may result in an inefficient use of system resources.

The discussion of the various FE and BER values set forth above is intended as one example of a preferred embodiment having three (3) different vocoder and channel coding rates. The FE and BER values set forth are merely exemplary, and any number of alternative FE and BER values may be chosen and implemented. The threshold values for the FE and BER values may be treated as system parameters, and may change for different vocoders. Also, FIG. 5 shows a state diagram with three (3) states, however, any number of states may be created within the present invention.

Mobile Station Control of Downlink Rate

Figure 6:
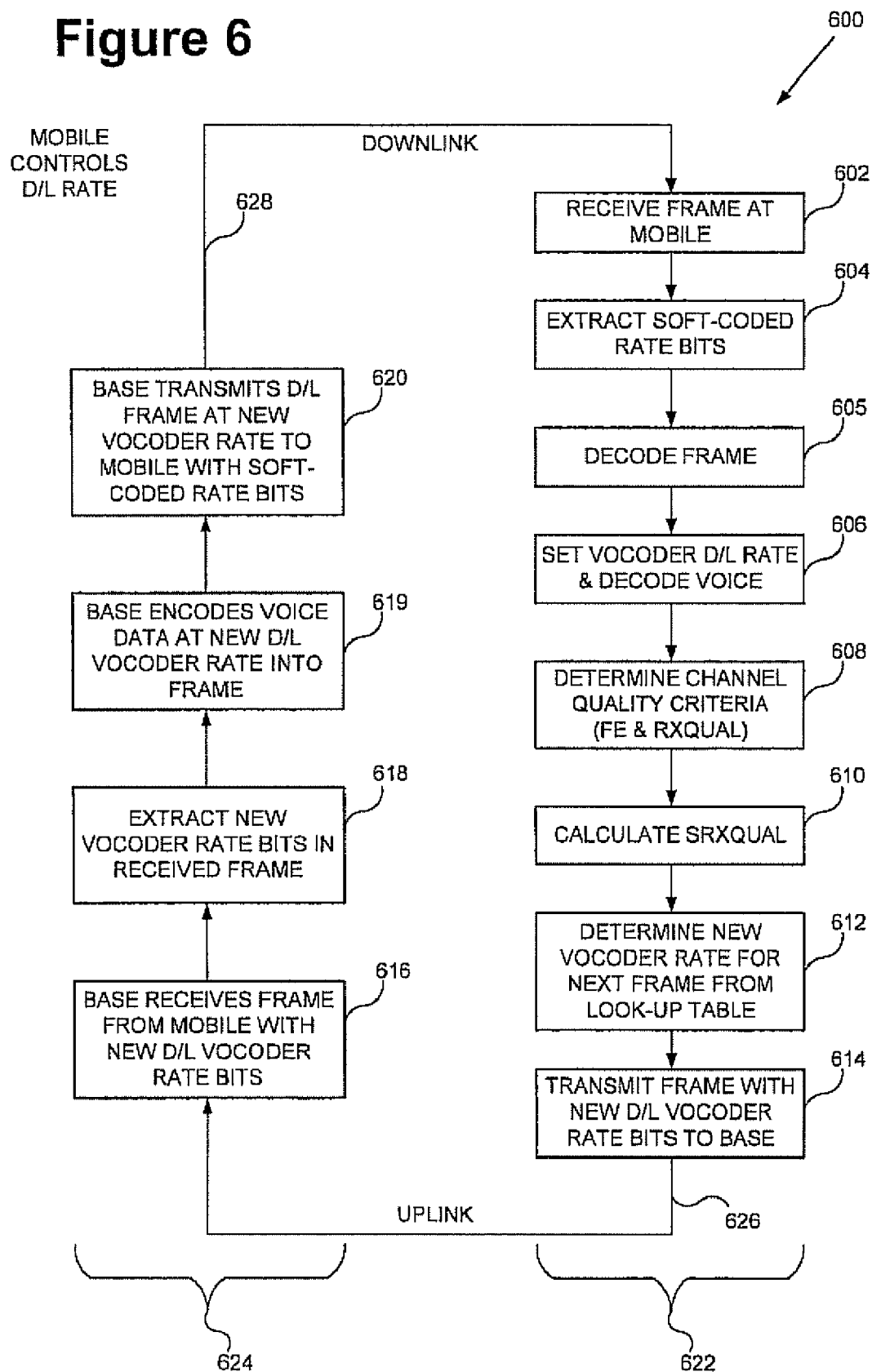
FIG. 6 depicts a sequence of steps which are performed in the communication system wherein the mobile station calculates the downlink vocoder rate based on its calculations of a number of channel quality metrics.

Referring now to FIG. 6, a flow chart representing the operation of the communication system of the present invention is shown and generally designated 600. In general, this configuration includes the MS determining the proper downlink vocoder rate and level of channel coding. Following this determination, the MS then transmits the necessary rate information to the BS.

Flow chart 600 begins with first step 602 which includes reception of a radio-frequency frame at the MS. Following receipt of the frame at the MS, the soft-coded rate bits are extracted from the frame data in step 604. In a preferred embodiment of the present invention and as discussed above in conjunction with FIG. 4, these soft-coded rate bits may include three (3) bits of rate information that can identify up to eight (8) different vocoder and channel coding rates. The frame data is then convolutionally decoded to yield the original speech block in step 605.

Using the appropriate vocoder and channel coding rate information extracted in step 604, the speech block is then decoded to recreate the original voice data in step 606. In this manner, the MS may receive a frame containing voice data encoded with virtually any vocoder rate, and the frame may be successfully decoded to the original voice data because all relevant vocoder rate information is transmitted within the frame in the form of soft-coded bits.

In order to provide the best possible voice communication channel, the MS determines the channel quality metrics discussed above, such as FE, BER and RXQ, in step 608. The MS also calculates the SRXQ value in step 610 and, based upon the results of the measured and calculated metrics, determines the vocoder rate for optimal voice quality in step 612. In a preferred embodiment of the present invention, the rate bits corresponding to the new vocoder and channel coding rate are determined from a look-up table. Once the vocoder and channel coding rate is determined, the MS transmits a frame with the new downlink vocoder rate convolutionally coded into the frame in step 614. Uplink 626 represents the transmission of a frame from the MS to the BS.

In step 616, the BS receives the frame containing the convolutionally-coded downlink vocoder rate for the next downlink transmission. Because it is not necessary to know the downlink vocoder rate in order to decode the uplink transmission, the downlink vocoder rate may be convolutionally encoded instead of soft-coded.

In step 618, the BS decodes the received frame from the MS yielding the new downlink vocoder rate bits. These vocoder rate bits are used to determine, using a look-up table or the like, the new downlink vocoder rate. Using that newly determined vocoder rate, the BS encodes the voice data in step 619 for transmission to the MS. In step 620, the BS transmits the frame containing the convolutionally encoded voice data and coded downlink vocoder rate bits to the MS. Downlink 628 represents the transmission of a frame from the BS to the MS.

Importantly, each downlink message includes as soft-coded bits the rate information related to the speech block. This is so because there exists a possibility that a frame may become corrupted and no longer readable. This corruption may create a situation wherein the MS may have transmitted a message frame in the uplink changing the downlink vocoder rate, and that frame was not successfully received by the BS. If this occurs, the MS would expect to receive a frame having a new vocoder rate, while the frame actually received would be encoded at the old rate. Additionally, in circumstances involving discontinuous transmissions (DTX), such as when the MS is not transmitting to save battery power, the channel characteristics and corresponding vocoder rate information could change significantly between transmitted frames. Consequently, in order to avoid such miscommunication, each speech block is soft-coded with the rate information necessary to decode the speech block.

In a preferred embodiment of the present invention as shown in FIG. 6, steps within sequence 600 identified by bracket 622 are performed within the MS, and steps within sequence 600 identified by bracket 624 are performed within the BS.

In any one cycle of uplink-downlink transmissions shown in FIG. 6, both the BS and the MS will inform the other of the appropriate vocoder rates for the transmitted message. For example, in an uplink frame containing convolutionally-coded rate bits for the next downlink frame, soft-coded rate bits will be present which will tell the BS what vocoder rate to use in decoding the uplink frame. Similarly, in a downlink frame containing convolutionally-coded rate bits for the next uplink frame, soft-coded rate bits will be present which will tell the MS what vocoder rate to use in decoding that downlink frame.

In the communication system of the present invention, it has been termed that vocoder rate bits which are not convolutionally encoded are "soft-coded" into the speech block, and the vocoder rate bits which are convolutionally encoder are "hard-coded" into the speech block. As an alternative terminology, the vocoder rate information which is convolutionally encoded into a speech block could also be considered an "inside" rate, as the vocoder rate information is within the convolutional coding. Vocoder rate information which is soft-coded into the speech-block is considered an "outside" rate, as the vocoder rate information is outside the convolutional coding.

Base Station Control of Downlink

Figure 7:
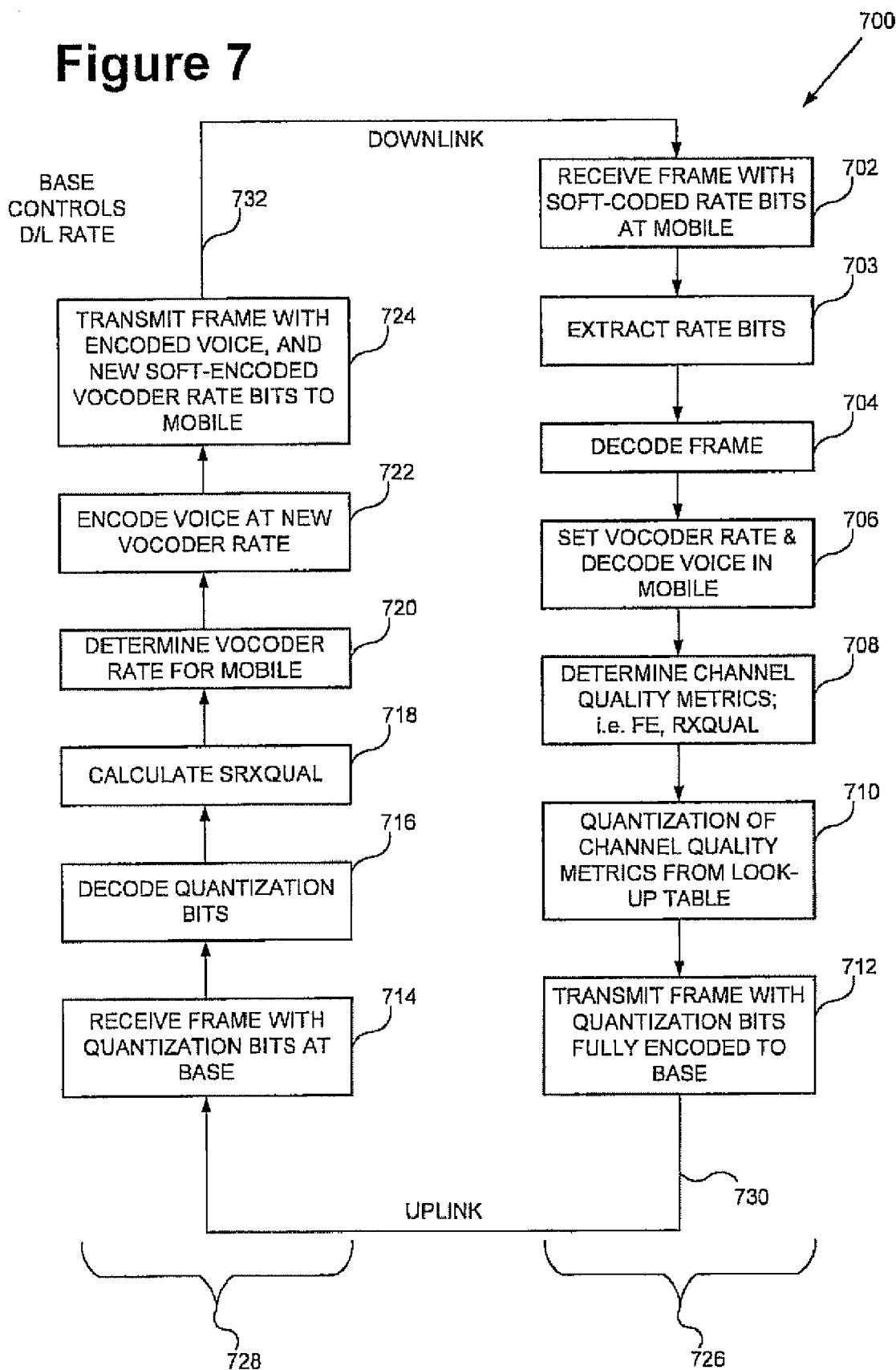
FIG. 7 depicts a sequence of steps which are performed in the communication system wherein the mobile station forwards its channel quality metrics to the base station where the vocoder rate for the downlink is determined and communicated to the mobile station.

Referring now to FIG. 7, a flow chart representing the operation of an alternative embodiment of the communication system of the present invention is shown and generally designated 700. In general, this configuration includes the MS monitoring a series of channel metrics and relaying this metric information to the BS for determining the proper downlink vocoder rate and level of channel coding. Following this determination, the BS then transmits the soft-coded rate bits to the MS with the following frame.

In first step 702, the MS receives a frame with soft-coded rate bits. In step 703, the MS extracts the soft-coded rate bits from the frame, and using a look-up table or the like, determines the appropriate downlink vocoder rate and level of channel coding. In step 704, using this rate information, the MS decodes the frame, yielding a speech block. In step 706, the vocoders are set to the appropriate rate and this speech block is decoded to re-create the original voice in the speech block.

During the decoding process, the MS is determining the channel quality of the communication system. For example, quality metrics such as FE and RXQ may be determined in step 708. Following the determination of FE and RXQ, a quantized vocoder value is determined in step 710 which reflects the current communication channel quality. Referring ahead briefly to FIG. 8, a quantization table is shown and generally designated 800. Quantization table 800 includes both the FE metric 802 and the RXQ metric 804 which are measured at the MS, and lists a number of non-uniform quantization values for each. These RXQ' values are the mid-range of the transmitted quantization levels, and represent a range of RXQ' metric values. Since the FE and RXQ' are both associated with the receiver performance, the quantization of RXQ' is based on the value of FE to effectively quantize RXQ' into eight levels. By locating the current measured values of both the FE and RXQ on the quantization table, a series of three (3) quantization bits are identified. For instance, for a FE value of 1 and a RXQ value of 25, quantization bits 1-0-0 are selected. Once the quantization bits are selected, in step 712 a frame is transmitted from the MS to the BS with the quantization bits fully encoded in the speech block. Uplink 730 represents the transmission of a frame from the MS to the BS.

In step 714, the frame is received at the BS with the quantization bits fully encoded. This frame is decoded in step 716 to yield the original quantization bits. Referring briefly to FIG. 9, a quantization table 900 is shown which provides a look-up table to reconstruct the FE and RXQ' values from the received quantization bits. For example, for quantization bits 1-0-0, a FE metric value 904 of "1" and an RXQ metric value 906 of "22." These metrics derived from the quantization bits are then used to calculate the SRXQ metric in step 718. Based upon the quantization bits and the results of the SRXQ calculation, a new vocoder rate is determined in step 720 by the BS. In step 722, voice data for the next speech block is encoded using the new vocoder rate, with the new vocoder rate bits being soft-coded into the speech block resulting in a new frame. This new frame is then transmitted from the BS to the MS in step 724. Downlink 732 represents the transmission of a frame from the BS to the MS.

Base Station Control of Uplink

In addition to the rate bits which are exchanged between the MS and the BS to govern the downlink vocoder and channel coding rate, the rate bits corresponding to the operation of the uplink are also exchanged. This is accomplished by the BS analyzing similar channel quality metrics which are used to determine the appropriate downlink vocoder rate as discussed in conjunction with FIG. 6.

Figure 10:
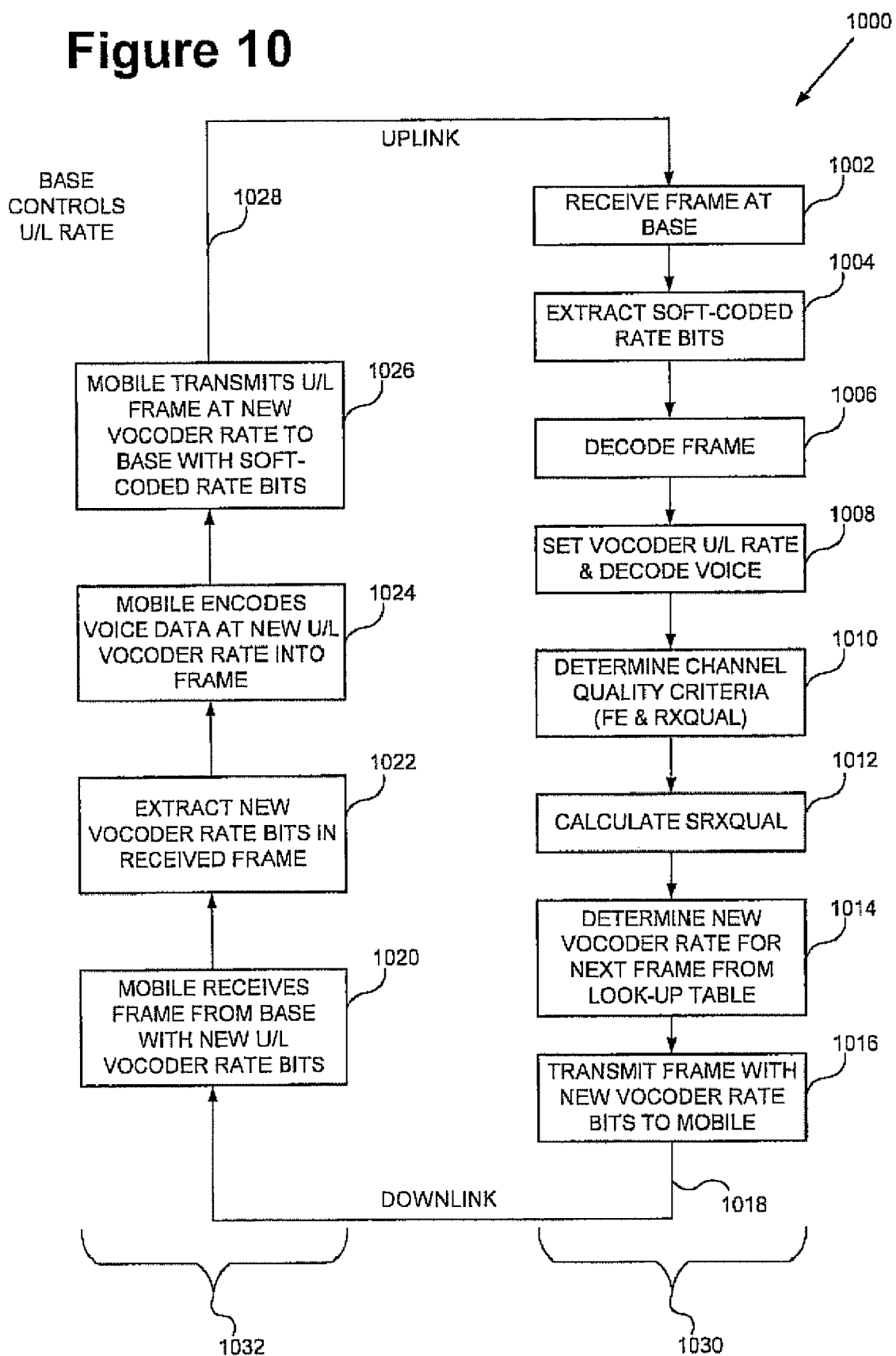
FIG. 10 depicts a sequence of steps which are performed in the communication system wherein the base station calculates the uplink vocoder rate based on its calculations of a number of channel quality metrics.

Referring now to FIG. 10, a flow chart representing the operation of an alternative embodiment of the communication system of the present invention is shown and generally designated 1000. In general, this configuration includes the BS monitoring a series of channel metrics determines the proper uplink vocoder rate and level of channel coding. Following this determination, the MS then transmits the soft-coded rate bits to the BS with the following frame.

Flow chart 1000 begins with first step 1002 which includes reception of a radio-frequency frame at the BS. Following receipt of the frame at the BS, the soft-coded rate bits are extracted from the frame data in step 1004. In a preferred embodiment of the present invention and as discussed above in conjunction with FIG. 4, these soft-coded rate bits may include three (3) bits of rate information that can identify up to eight (8) different vocoder and channel coding rates. The frame data is then convolutionally decoded to yield the original speech block in step 1006.

Using the appropriate vocoder and channel coding rate information extracted in step 1004, the speech block is then decoded to recreate the original voice data in step 1008. In this manner, the BS may receive a frame containing voice data encoded with virtually any vocoder rate, and the frame may be successfully decoded to the original voice data because all relevant vocoder rate information is transmitted within the frame in the form of soft-coded bits.

In order to provide the best possible voice communication channel, the BS determines the channel quality metrics discussed above, such as FE, BER and RXQ, in step 1010. The BS also calculates the SRXQ value in step 1012 and, based upon the results of the measured and calculated metrics, determines the vocoder rate for optimal voice quality in step 1014. In a preferred embodiment of the present invention, the rate bits corresponding to the new vocoder and channel coding rate are determined from a look-up table. Once the vocoder and channel coding rate is determined, the BS transmits a frame with the new uplink vocoder rate convolutionally coded into the frame in step 1016. Downlink 1018 represents the transmission of a frame from the BS to the MS.

In step 1020, the MS receives the frame containing the convolutionally-coded uplink vocoder rate for the next downlink transmission. Because it is not necessary to know the uplink vocoder rate in order to decode the uplink transmission, the uplink vocoder rate may be convolutionally encoded instead of soft-coded.

In step 1022, the MS decodes the received frame from the BS yielding the new uplink vocoder rate bits. These vocoder rate bits are used to determine, using a look-up table or the like, the new uplink vocoder rate. Using that newly determined vocoder rate, the MS encodes the voice data in step 1024 for transmission to the BS. In step 1026, the MS transmits the frame containing the convolutionally encoded voice data and soft-coded uplink vocoder rate bits to the BS. Uplink 1028 represents the transmission of a frame from the MS to the BS.

Importantly, each uplink message includes as soft-coded bits the rate information related to the speech block. This soft-coding enables the BS to properly decode the speech block without knowing in advance the vocoder rate. This is particularly advantageous because there exists a possibility that a frame may become corrupted and no longer readable. This corruption may create a situation wherein the BS may have transmitted a message frame in the downlink changing the uplink vocoder rate, and that frame was not successfully received by the MS. If this occurs, the BS would expect to receive a frame having a new vocoder rate, while the frame actually received would be encoded at the old rate. Additionally, in circumstances involving discontinuous transmissions (DTX), such as when the BS is not continuously transmitting, the channel characteristics and corresponding vocoder rate information could change significantly between transmitted frames. Consequently, in order to avoid such mis-communication, each speech block is soft-coded with the rate information necessary to decode the speech block.

In a preferred embodiment of the present invention as shown in FIG. 10, steps within sequence 1000 identified by bracket 1030 are performed within the BS, and steps within sequence 1000 identified by bracket 1032 are performed within the MS.

System Performance

The communication system of the present invention provides for the block and bit interleaving thereby minimizing the disruption to the communication link caused by channel noise, interference, and dropped frames. In addition to such redundancy, the vocoder rate information which is either hard-coded within the frame or soft-coded outside the frame, may also be repetitive. Such repetition will further enhance the resilience of the communication system of the present invention. Redundancy of the vocoder rate information, or rate bits, may be accomplished by repeating the bits in several locations within the speech frame, as mentioned above in conjunction with FIG. 4.

Like traditional GSM-based communication systems, the communication system of the present invention provides for the transfer, or "hand-off," of a MS from one BS to another BS in a different cell. In such a hand-off, it would not be necessary to provide the new BS with any special rate information via the communication link 108 as all necessary vocoder rate information is presented in each frame transmitted from the MS.

The present invention may be implemented in either a full-rate or half-rate GSM-based communication system. The encoding and transmission of the vocoder rate information between the BS and MS in both the full and half-rate system would be identical.

In addition to the modification of the vocoder rate and channel coding as discussed above, the power level of the transmissions may also be modified in order to provide the best possible voice quality. For example, in FIGS. 8 and 9, rate bits 806 and 902 may take into consideration, in addition to the FE and RXQ' metrics, a metric related to the power level of the transmission. In such a situation, the BS may adjust the vocoder rate and channel coding, while at the same time adjusting the BS transmit power to minimize the BER or FE, resulting in better voice quality.

While the present invention has been discussed at length with respect to the transmission of voice data between a BS and a MS, it should be appreciated that any digital data may be communicated in a similar manner. In fact, because other types of digital data may not be dependent upon the audio sampling rates, a much higher data rate may be achieved using the present invention, and is fully contemplated herein.

Other Embodiments

While there have been shown what are presently considered to be preferred embodiments of the invention, it will be apparent to those skilled in the art that various changes and modifications can be made herein without departing from the scope and spirit of the invention as defined by the appended claims and their equivalents.

What is claimed is:

1. A method of receiving voice data from a transmitting side at a receiving side in a wireless communication system, the method comprising:
   determining, at the receiving side, a quality indicator of a communication channel by measuring a channel quality metric;
   determining, at the receiving side, a first vocoder rate based on the determined quality indicator, wherein the first vocoder rate is for the receiving side to request the transmitting side to use to encode voice data to be received by the receiving side via a first direction link;
   transmitting, from the receiving side to the transmitting side via a second direction link, a first data frame including first rate bits indicating the first vocoder rate to request the transmitting side to use the first vocoder rate; and
   receiving, at the receiving side from the transmitting side via the first direction link, a second data frame including soft-coded second rate bits to inform the receiving side of a second vocoder rate that was applied when encoding voice data presently received via the first direction link, third rate bits informing the receiving side of a third vocoder rate to be used for transmission via the second direction link, and the voice data,
   wherein the receiving side is informed of the second vocoder rate that was applied when encoding the presently received voice data based on the soft-coded second rate bits even though the second vocoder rate is different from the first vocoder rate requested by the receiving side.

2. The method of claim 1, wherein determining the first vocoder rate comprises considering hysteresis.

3. The method of claim 1, wherein the transmitting side is a base station and the receiving side is a mobile station.

4. The method of claim 1, wherein the transmitting side is a mobile station and the receiving side is a base station.

* * * * *